United States Patent Office 3,392,983
Patented July 16, 1968

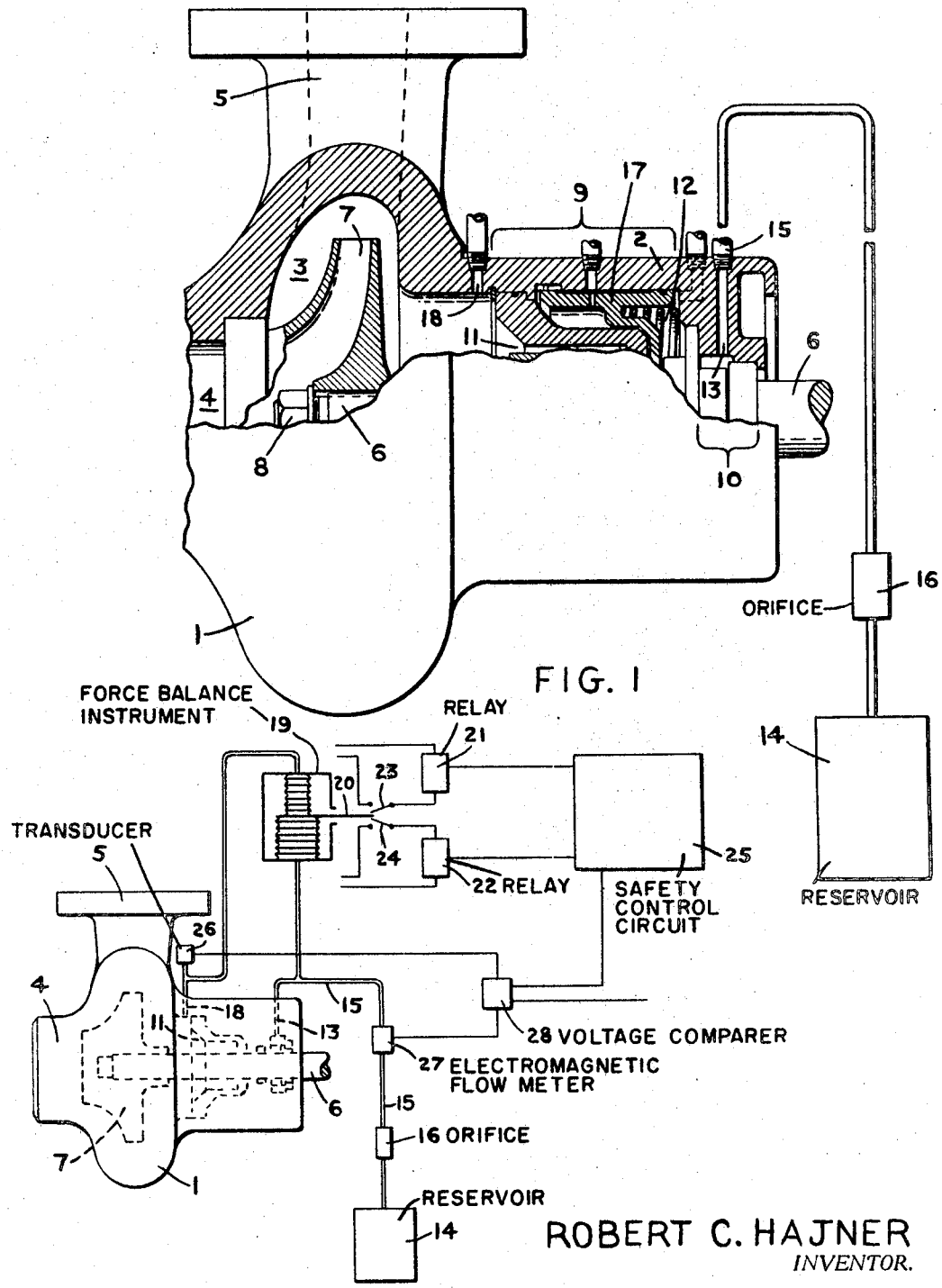

3,392,983
SAFETY CONTROL DEVICE FOR USE WITH
MECHANICAL SEALS
Robert C. Hajner, Linden, N.J., assignor, by mesne assignments, to the United States of America as represented by the United States Atomic Energy Commission
Filed Oct. 22, 1965, Ser. No. 501,569
13 Claims. (Cl. 277—28)

ABSTRACT OF THE DISCLOSURE

A safety control system for continually monitoring the operation of a controlled leakage seal for rotating equipment. Three variables of the seal performance namely the pressures immediately upstream and downstream of the seal and the flow rate through the seal are compared with one another. Deviations beyond predetermined limits energize a safety control circuit which can actuate remedial or warning equipment.

---

This device relates generally to an automatic controller for use with equipment handling fluid under pressure, and more particularly, to a safety controller which derives its input signals from the major variables affecting the performance of very high pressure mechanical seals used on rotating shafts in high pressure pumping equipment.

In high pressure fluid circulating systems, such as a boiler circulating system in a power station where the operating pressure frequently exceeds 1,000 pounds per square inch (p.s.i.g.), mechanical seals are used to seal the shaft of the prime mover between the region of high pressure and the region of atmospheric pressure.

In such systems it is desirable to effect a planned shutdown of the pump or an orderly transfer of pumping operations at the first indication of mal-operation of the seal, i.e. before the system is adversely affected by said mal-operation.

The present invention fulfills this desire by monitoring the operation of the seal. It operates by continuously measuring three variables of seal performance, namely, the pressure on the upstream or high pressure side of the seal, the pressure on the downstream side, and the rate of flow of the fluid leaking through the seal. These measurements are compared with one another, and are allowed to vary within given deviations. Before the deviation of seal performance as registered by these measured variables exceeds predetermined limits, electrical signals energize a safety control circuit which can be used for such corrective action as: (a) stopping the pump; (b) providing a warning indication, e.g. a bell or light; or (c) starting a stand-by pump.

Accordingly, it is an object of this invention to provide a safety control device for use with mechanical seals in high pressure pumping systems, wherein the fluid pressures through the seal and the flow leakage rate are measured to monitor the limits of safe seal operation.

It is another object of this invention to provide a safety control device for use in conjunction with the "Mechanical Seal With Controlled Leakage," as described and claimed in U.S. Patent Number 3,085,808, issued to J. G. Williams on Apr. 16, 1963, and the "Low Leakage Mechanical Seal For High Pressure Pumps," as described and claimed in U.S. Patent Number 3,141,677, issued to J. G. Williams on July 21, 1964.

It is another object of this invention to provide a safety control device for automatically controlling pumping operations in response to changes in seal performance, wherein the seal operating variables are under continuous automatic surveillance.

These and other objects and advantages of the invention will become evident from the following description with reference to the accompanying drawings in which:

FIGURE 1 is a diagrammatic sketch of the invention specifically applied to the "Mechanical Seal With Controlled Leakage, Patent No. 3,085,808," although it is also applicable to the "Low Leakage Mechanical Seal for High Pressure Pumps," Patent No. 3,141,677; and FIGURE 2 is a schematic representation of the invention showing force balancing means, and electrical circuitry and instrumentation.

Referring to the drawings, FIGURE 1 shows a pump for a high pressure fluid circulation system having a casing 1 and a seal housing 2 connected or formed integrally therewith.

The casing forms an impeller chamber 3 having a centrally disposed suction inlet 4 and a discharge outlet 5 communicating with the periphery of the chamber.

A shaft 6 extends through the seal housing 2 into the impeller chamber 3 where it receives the impeller 7 on its inner end by any suitable means such as a threaded member 8.

The "Mechanical Seal With Controlled Leakage, Patent No. 3,085,808" 9 and a conventional low pressure seal housing 2.

In operation, fluid at high static pressure at all times fills the impeller chamber 3, the suction inlet 4, the discharge outlet 5, and enters the seal 9 at 11. A controlled amount of fluid flows through the seal 9 as described in Patent No. 3,085,808 and enters the piston section 12 at a very low fluid pressure. The flow is conveyed from the piston section to passage 13 and through conduit 15 to a reservoir or container 14. Orifice 16 disposed in conduit 15 establishes the quantity of leakage flow. The low fluid pressure in piston section (12) acts on piston 17 and is transmitted through conduit 15 to the orifice 16.

The ratio of pressure entering the high pressure seal at 11 and on piston 17 is mathematically determined from balanced hydraulic forces. Variation of the ratio of pressures beyond acceptable limits will therefore be indicative that some malfunction of seal 9 has occurred.

The quantity of leakage flow through seal 9 set by orifice 16 is proportionately related to the pressure entering the seal at 11. Variation in this proportional relationship beyond acceptable limits will indicate that the seal is not operating at the optimum condition and that potential malfunction could occur.

There are many types of instruments and equipment well known in the control art which could be purchased to measure the relationship of the aforementioned critical variables and to utilize the output signal of such instruments and equipment in a circuit to perform a specific task.

One means for measuring the ratio of pressures entering the seal at 11 and on piston 17 is illustrated in FIG. 2 which shows a force balance instrument generally designated 19. The pressure at 11 is measured through passage 18 and the pressure on piston 17 is measured by the connecting line to conduit 15. The area ratio of the instrument is selected to correspond with the design pressure ratio of the seal.

Movement of extension 20 to the extreme high and low limits of the tolerable pressure ratio range energizes the safety control circuit 25 through relays 21 and 22 and switches 23 and 24.

A means of measuring the proportional relationship of the leakage flow to the pressure at 11 is also illustrated in FIG. 2. The pressure at 11 measured through passage 18 and the flow rate measured in conduit 15 are respectively converted to voltage signals by transducer 26 and electromagnetic flowmeter 27. A predetermined proportion of the transducer output voltage is compared in 28 to the output voltage of the electromagnetic flowmeter. Any variation of the voltage comparison beyond the acceptable high and low limits will generate a signal to energize the safety control circuit 25.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. In pressure fluid handling equipment having a rotating shaft with a controlled leakage mechanical seal mounted thereabout, the combination therewith of a safety control device comprising:
    (a) Means connected to said pressure fluid handling equipment for measuring the differential pressure across said seal;
    (b) Means connected to the downstream side of said seal for measuring the leakage flow therefrom;
    (c) Means connected to the upstream side of said seal for measuring the fluid pressure thereat;
    (d) Means connected to said leakage flow measuring means and said upstream fluid pressure measuring means for comparing their respective measurements; and
    (e) Means connected to said differential pressure measuring means and said last mentioned comparison means and disposed to coact therewith to automatically monitor the limits of safe seal operation and automatically control said pressure fluid handling equipment.

2. In pressure fluid handling equipment having a rotating shaft with a controlled leakage mechanical seal mounted thereabout, the combination therewith of a safety control device comprising:
    (a) A force balance instrument shunting said seal for measuring the differential pressure across said seal;
    (b) Means connected to the downstream side of said seal for measuring the leakage flow therefrom;
    (c) Means connected to the upstream side of said seal for measuring the fluid pressure thereat;
    (d) Means connected to said leakage flow measuring means and said upstream fluid pressure measuring means for comparing their respective measurements; and
    (e) Means connected to said differential pressure measuring means and said last mentioned comparison means and disposed to coact therewith to automatically monitor the limits of safe seal operation and automatically control said pressure fluid handling equipment.

3. In pressure fluid handling equipment having a rotating shaft with a controlled leakage mechanical seal mounted thereabout, the combination therewith of a safety control device comprising:
    (a) Means connected to said pressure fluid handling equipment for measuring the differential pressure across said seal;
    (b) A flowmeter connected to the downstream side of said seal for measuring the leakage flow therefrom;
    (c) Means connected to the upstream side of said seal for measuring the fluid pressure thereat;
    (d) Means connected to said leakage flow measuring means and said upstream fluid pressure measuring means for comparing their respective measurements; and
    (e) Means connected to said differential pressure measuring means and said last mentioned comparison means and disposed to coact therewith to automatically monitor the limits of safe seal operation and automatically control said pressure fluid handling equipment.

4. In pressure fluid handling equipment having a rotating shaft with a controlled leakage mechanical seal mounted thereabout, the combination therewith of a safety control device comprising:
    (a) Means connected to said pressure fluid handling equipment for measuring the differential pressure across said seal;
    (b) An electromagnetic flowmeter connected to the downstream side of said seal for measuring the leakage flow therefrom, and converting said measurement into a voltage signal;
    (c) A transducer connected to the upstream side of said seal for measuring the pressure thereat, and converting said pressure measurement into a voltage signal;
    (d) A voltage comparator connected to said electromagnetic flowmeter and to said transducer for comparing the voltage signals produced by them;
    (e) Means connected to said differential pressure measuring means and said last mentioned comparison means and disposed to coact therewith to automatically monitor the limits of safe seal operation and automatically control said pressure fluid handling equipment.

5. In pressure fluid handling equipment having a rotating shaft with a controlled leakage mechanical seal mounted thereabout, the combination therewith of a safety control device comprising:
    (a) A force balance instrument shunting said seal for measuring the differential pressure across said seal;
    (b) A flowmeter connected to the downstream side of said seal for measuring the leakage flow therefrom;
    (c) Means connected to the upstream side of said seal for measuring the fluid pressure thereat;
    (d) Means connected to said leakage flow measuring means and said upstream fluid pressure measuring means for comparing their respective measurements; and
    (e) Means connected to said differential pressure measuring means and said last mentioned comparison means and disposed to coact therewith to automatically monitor the limits of safe seal operation and automatically control said pressure fluid handling equipment.

6. An apparatus as in claim 5 wherein an orifice is connected downstream of said flowmeter for establishing the quantity of leakage flow through said seal, and a reservoir is disposed downstream of said orifice for collecting said leakage flow.

7. In pressure fluid handling equipment having a rotating shaft with a controlled leakage mechanical seal mounted thereabout, the combination therewith of a safety control device comprising:
    (a) A force balance instrument shunting said seal for measuring the differential pressure across said seal;
    (b) An electromagnetic flowmeter connected to the downstream side of said seal for measuring the leakage flow therefrom, and converting said measurement into a voltage signal;
    (c) A transducer connected to the upstream side of said seal for measuring the pressure thereat, and converting said pressure measurement into a voltage signal;
    (d) A voltage comparator connected to said electromagnetic flowmeter and to said transducer for comparing the voltage signals produced by them;
    (e) Means connected to said differential pressure measuring means and said last mentioned comparison means and disposed to coact therewith to automatically monitor the limits of safe seal operation and automatically control said pressure fluid handling equipment.

8. An apparatus as in claim 7 wherein an orifice is connected downstream of said flowmeter for establishing the quantity of leakage flow through said seal, and a reservoir is disposed downstream of said orifice for collecting said leakage flow.

9. In pressure fluid handling equipment having a rotating shaft with a controlled leakage mechanical seal mounted thereabout, the combination therewith of a safety control device comprising:

(a) Means connected to said pressure fluid handling equipment for measuring the differential pressure across said seal;
(b) Means disposed to coact electrically with said differential pressure measuring means and to produce thereby an electric signal;
(c) Means connected to the downstream side of said seal for measuring the leakage flow therefrom;
(d) Means connected to the upstream side of said seal for measuring the fluid pressure thereat;
(e) Means connected to said leakage flow measuring means and said upstream fluid pressure measuring means for comparing their respective measurements;
(f) Means connected to said last mentioned comparison means and disposed to coact electrically therewith and to produce thereby an electric signal; and
(g) Means connected to both of said electric signal producing means for utilizing said electric signals to automatically monitor the limits of safe seal operation and automatically control said pressure fluid handling equipment.

10. In pressure fluid handling equipment having a rotating shaft with a controlled leakage mechanical seal mounted thereabout, the combination therewith of a safety control device comprising:

(a) A force balance instrument shunting said seal for measuring the differential pressure across said seal;
(b) An arm extending from said instrument and disposed to move through a path in direct proportion to said differential pressure measurement;
(c) Electric switches at either end of said path and disposed to close upon making contact with said arm, and open upon breaking contact with said arm;
(d) Relays connected by circuits to said switches to coact electrically therewith when said switches are closed, and to produce thereby electric signals;
(e) Means connected to the downstream side of said seal for measuring the leakage flow therefrom;
(f) Means connected to the upstream side of said seal for measuring the fluid pressure thereat;
(g) Means connected to said leakage flow measuring means and said upstream fluid pressure measuring means for comparing their respective measurements;
(h) Means connected to said last mentioned voltage comparator for converting said voltage comparison into an electric signal; and
(i) A safety control circuit connected to said voltage comparator and said relays to provide automatic control of said pressure fluid handling equipment in response to the electric signals produced by said voltage comparator and said relays.

11. In pressure fluid handling equipment having a rotating shaft with a controlled leakage mechanical seal mounted thereabout, the combination therewith of a safety control device comprising:

(a) Means connected to said pressure fluid handling equipment for measuring the differential pressure across said seal;
(b) Means disposed to coact electrically with said differential measuring means and to produce thereby an electric signal;
(c) An electromagnetic flowmeter connected to the downstream side of said seal for measuring the leakage flow therefrom, and converting said measurement into a voltage signal;
(d) A transducer connected to the upstream side of said seal for measuring the pressure thereat, and converting said pressure measurement into a voltage signal;
(e) A voltage comparator connected to said electromagnetic flowmeter and to said transducer for comparing the voltage signals produced by them;
(f) Means connected to said last mentioned comparison means and disposed to coact electrically therewith and to produce thereby an electric signal; and
(g) Means connected to both of said electric signal producing means for utilizing said electric signals to automatically monitor the limits of safe seal operation and automatically control said pressure fluid handling equipment.

12. In pressure fluid handling equipment having a rotating shaft with a controlled leakage mechanical seal mounted thereabout, the combination therewith of a safety control device comprising:

(a) A force balance instrument shunting said seal for measuring the differential pressure across said seal;
(b) An arm extending from said instrument and disposed to move through a path in direct proportion to said differential pressure measurement;
(c) Electric switches at either end of said path and disposed to close upon making contact with said arm, and open upon breaking contact with said arm;
(d) Relays connected by circuits to said switches to coact electrically therewith when said switches are closed, and to produce thereby electric signals;
(e) An electromagnetic flowmeter connected to the downstream side of said seal for measuring the leakage flow therefrom, and converting said measurement into a voltage signal;
(f) A transducer connected to the upstream side of said seal for measuring the pressure thereat, and converting said pressure measurement into a voltage signal;
(g) A voltage comparator connected to said electromagnetic flowmeter and to said transducer for comparing the voltage signals produced by them;
(h) Means connected to said last mentioned comparison means and disposed to coact electrically therewith and to produce thereby an electric signal; and
(i) Means connected to both of said electric signal producing means for utilizing said electric signals to automatically monitor the limits of safe seal operation and automatically control said pressure fluid handling equipment.

13. An apparatus as in claim 12 wherein an orifice is connected downstream of said flowmeter for establishing the quantity of leakage flow through said seal, and a reservoir is disposed downstream of said orifice for collecting said leakage flow.

No references cited.

SAMUEL ROTHBERG, *Primary Examiner.*